United States Patent [19]
Wallace

[11] Patent Number: 5,933,644
[45] Date of Patent: Aug. 3, 1999

[54] METHOD AND APPARATUS FOR CONFLICT-BASED BLOCK REORDERING

[75] Inventor: David R. Wallace, San Francisco, Calif.

[73] Assignee: Sun Microsystems, Inc., Palo Alto, Calif.

[21] Appl. No.: 08/878,436

[22] Filed: Jun. 18, 1997

[51] Int. Cl.⁶ ........................................................ G06F 9/45
[52] U.S. Cl. .......................... 395/709; 395/580; 395/581
[58] Field of Search ...................................... 395/709, 704, 395/183.14, 582, 584, 580–583, 588, 380–381, 390, 392

[56] References Cited

U.S. PATENT DOCUMENTS

| | | | |
|---|---|---|---|
| 5,249,295 | 9/1993 | Briggs et al. | 395/709 |
| 5,659,754 | 8/1997 | Grove et al. | 395/709 |
| 5,774,730 | 6/1998 | Aizikowitz et al. | 395/709 |
| 5,787,284 | 7/1998 | Blainey et al. | 395/701 |
| 5,790,858 | 8/1998 | Vogel | 395/704 |
| 5,797,012 | 8/1998 | Blainey et al. | 395/705 |

OTHER PUBLICATIONS

Karl Pettis et al. "Profile Guided Code Positioning," Proceedings of the ACM SIGPLAN '90 Conference On Programming Language Design and Implementation, Jun. 20–22, 1990, Sigplan Notices vol. 25, No. 6, pp. 16–27.

Wen–mei W. Hwu et al. "Achieving High Instruction Cache Performance with an Optimizing Compiler," Proceedings of The 16th Annual International Symposium on Computer Architecture, IEEE, 1989, pp. 242–251.

Brad Calder et al. "Reducing Branch Costs via Branch Alignment," ACM, ASPLOS V1, 1994, pp. 242–251.

Thomas Ball et al. "Optimally Profiling and Tracing Programs," ACM Transactions on Programming Languages and Systems, vol. 16, No. 4, Jul. 1994, pp. 1320–1360.

*Primary Examiner*—Tariq R. Hafiz
*Assistant Examiner*—Tuan Q. Dam
*Attorney, Agent, or Firm*—Graham & James LLP

[57] ABSTRACT

A method and apparatus for ordering blocks of code by a compiler. The compiler generates a conflict graph in accordance with the blocks of a computer program being compiled. Once the conflict graph is generated, a preferred embodiment of the present invention finds maximum weight independent set (MWS) of nodes in the conflict graph. By definition, the nodes in the MWS have no flow control conflicts between them. The compiler then generates an object program having blocks ordered in accordance with the maximum weight independent set.

15 Claims, 10 Drawing Sheets

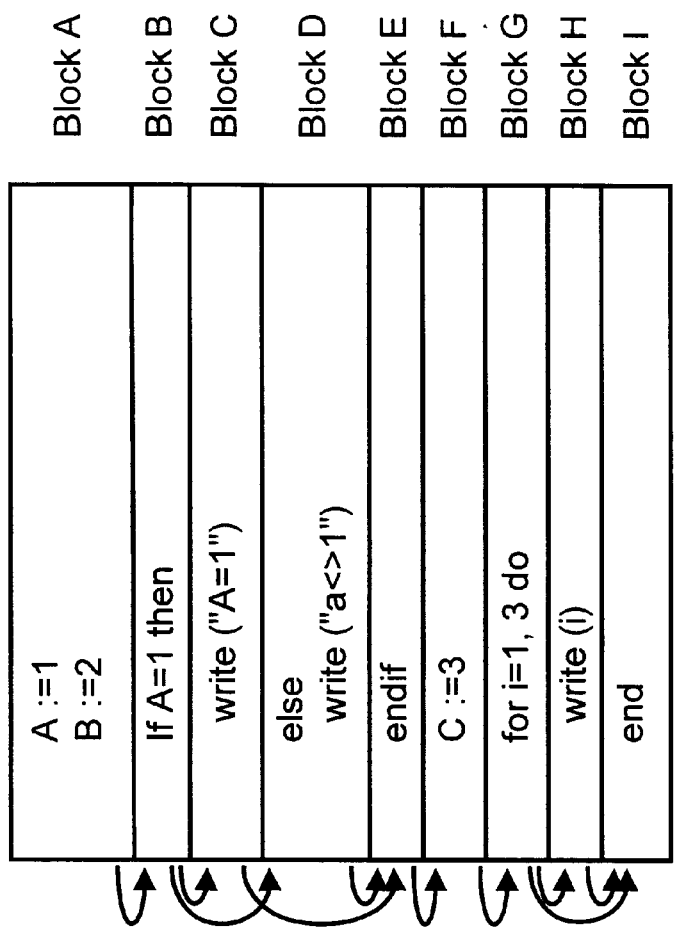
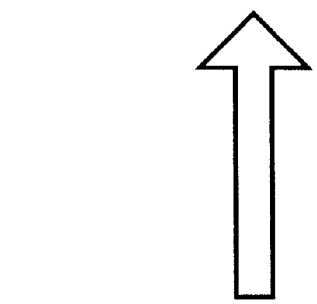
Fig. 4

Generate a MWS

Lookahead Test

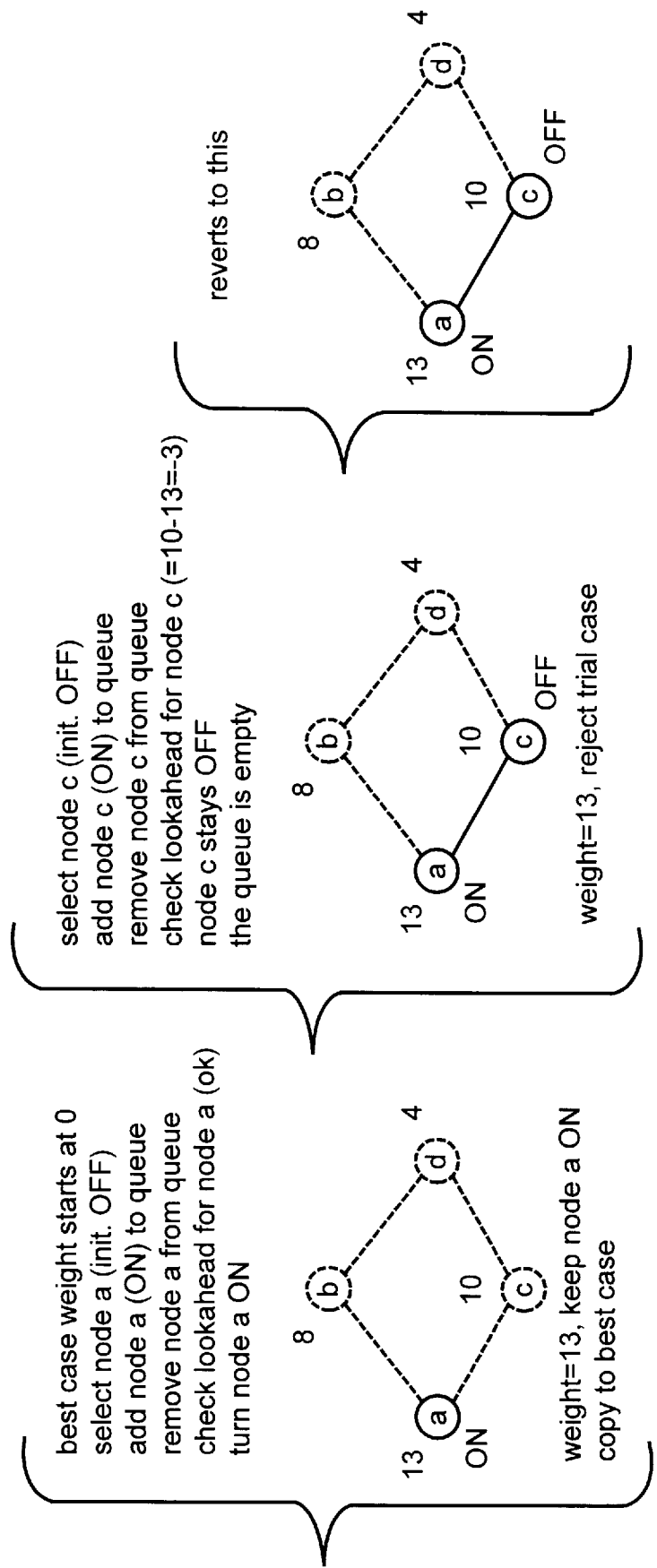

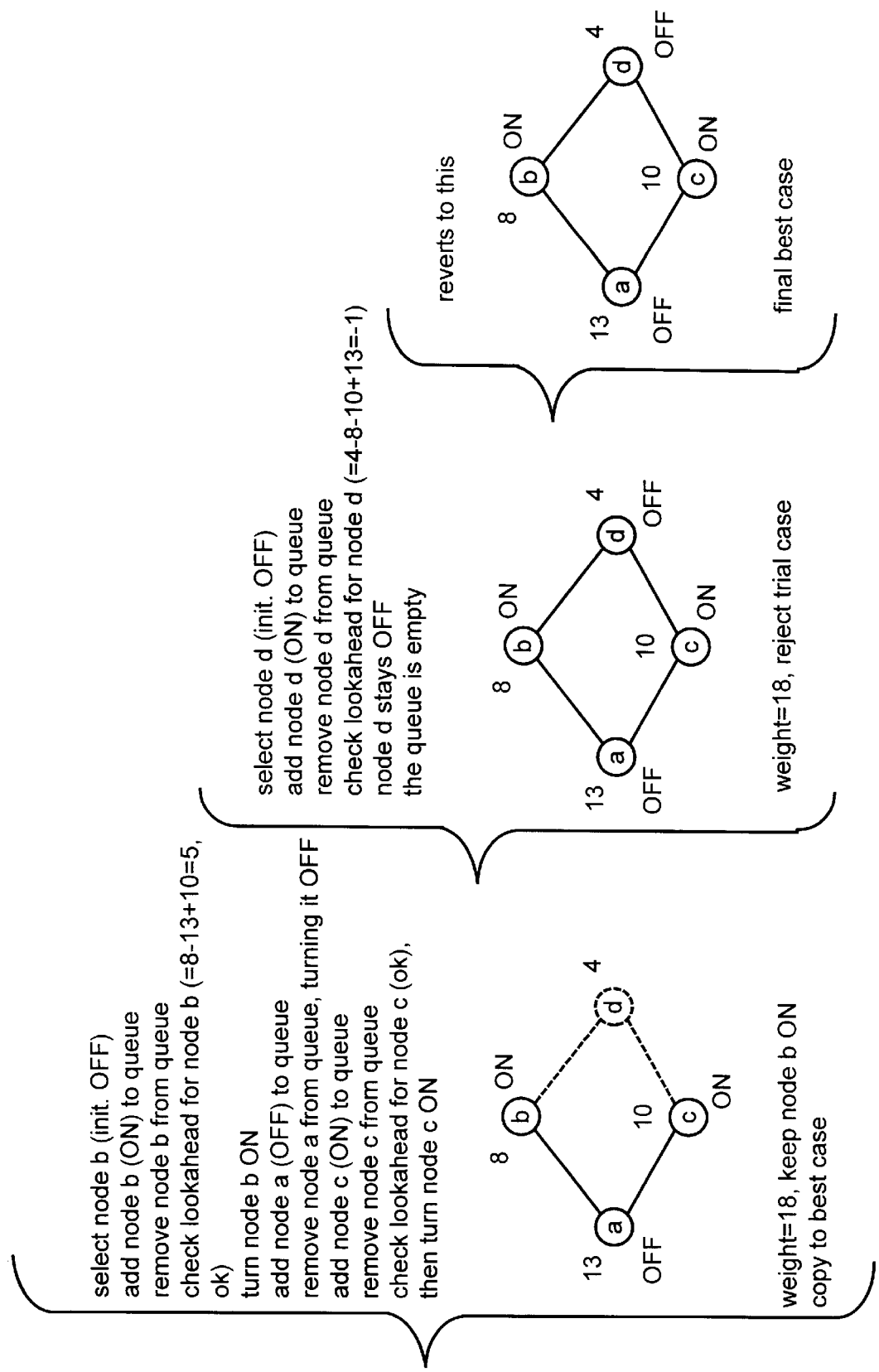

METHOD AND APPARATUS FOR CONFLICT-BASED BLOCK REORDERING

FIELD OF THE INVENTION

This application relates to compiler software and, specifically, to a method and apparatus for reordering blocks in a compiled computer program, resulting in efficient execution of the computer program.

BACKGROUND OF THE INVENTION

Human beings often write computer programs in a "high level language," such as C. Computer programs (called "source programs") written in a high level language must be converted into instructions understandable by a computer. This process is called "compiling" the program and is performed by a software program called a "compiler." Thus, a compiler compiles a source program (written in a high level language) into an "object" program, which contains instructions executable by the computer.

Source programs can be thought of as being divided into "logical" blocks. Each block contains one or more statements in the source program. Conventional compilers often rearrange the order of blocks to make execution of the resulting object program more efficient.

Some conventional compilers produce object programs that execute inefficiently. An example of a source program that is often compiled to execute inefficiently is a source program containing a "branch" instruction, such as an "if-then-else" statement. Inefficiencies result when the compiler compiles an "if-then-else" statement in such a way that the computer executing the compiled branch instruction frequently has to transfer execution to a different location in the program. In contrast, a more efficient compilation generates an object program where the computer executing the compiled branch instruction usually "falls through" the branch instruction without having to transfer execution to a different part of the program. Unfortunately, rearranging the blocks of a computer program has some constraints, since making one block a fall-through prevents other blocks from being fall throughs.

What is needed is a compiler that generates an object program that causes more "fall throughs" and fewer branches during execution.

SUMMARY OF THE INVENTION

The present invention overcomes the problems and disadvantages of the prior art by generating a conflict graph in accordance with the blocks of a computer program. The conflict graph is generated by dividing the computer program into a plurality of blocks and generating a control flow graph (CFG) representing the flow of control between the blocks. Each edge of the CFG has an associated weight representing a profile frequency count of the path corresponding to the edge. The conflict graph is generated in accordance with the CFG. Once the conflict graph is generated, a preferred embodiment of the present invention finds maximum weight independent set (MWS) of nodes in the conflict graph. By definition, the nodes in the MWS have no flow control conflicts between them. The compiler then generates an object program having blocks ordered in accordance with the maximum weight independent set and the CFG.

In accordance with the purpose of the invention, as embodied and broadly described herein, the invention relates to a method of ordering the blocks of a computer program for efficient execution, the method comprising the steps, performed by a data processing system, of: dividing the computer program into a plurality of blocks; generating a control flow graph representing the flow of control between the plurality of blocks; generating a conflict graph in accordance with the control flow graph, where the edges of the conflict graph indicate which paths in the flow of control have conflicts; determining a maximum weight independent set of the conflict graph; and ordering the blocks of the computer program in accordance with the determined maximum weight independent set.

In further accordance with the purpose of the invention, as embodied and broadly described herein, the invention relates to a method of ordering the blocks of a computer program for efficient execution, the method comprising the steps, performed by a data processing system, of: dividing the computer program into a plurality of blocks; generating a control flow graph representing the flow of control between the plurality of blocks; generating a conflict graph in accordance with the control flow graph, where the edges of the conflict graph indicate which paths in the flow of control have conflicts; determining a maximum weight independent set of the conflict graph, the determining step including the steps of: turning an initial node in the conflict graph ON and placing it on a queue in a memory, removing a next node, v, from the queue, when the direction of a next node on the queue is ON, and when any neighbor nodes of v are selected and ON, turning the neighbor nodes OFF and placing the neighbor nodes on the queue, when the direction of a next node on the queue is OFF, and when any neighbor nodes of v are OFF, turning the neighbor nodes ON and placing the neighbor nodes on the queue, and keeping the highest weight set thus far as the new maximum weight independent set; and ordering the blocks of the computer program in accordance with the determined maximum weight independent set.

In further accordance with the purpose of the invention, as embodied and broadly described herein, the invention relates to an apparatus that orders the blocks of a computer program for efficient execution, the apparatus comprising: a portion configured to divide the computer program into a plurality of blocks; a portion configured to generate a control flow graph representing the flow of control between the plurality of blocks; a portion configured to generate a conflict graph in accordance with the control flow graph, where the edges of the conflict graph indicate which paths in the flow of control have conflicts; a portion configured to determine a maximum weight independent set of the conflict graph; and a portion configured to order the blocks of the computer program in accordance with the determined maximum weight independent set.

Objects and advantages of the invention will be set forth in part in the description which follows and in part will be obvious from the description or may be learned by practice of the invention. The objects and advantages of the invention will be realized and attained by means of the elements, method steps and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 shows an example of a source program divided into blocks.

FIGS. 8(a) through 8(f) show an example of how the embodiment of FIG. 2 determines a maximum weight independent set.

DESCRIPTION OF A PREFERRED EMBODIMENT

Reference will now be made in detail to a preferred embodiment of the invention, an example of which is illustrated in the accompanying drawings. Wherever possible, the same reference numbers will be used throughout the drawings to refer to the same or like parts.

Figure 1:
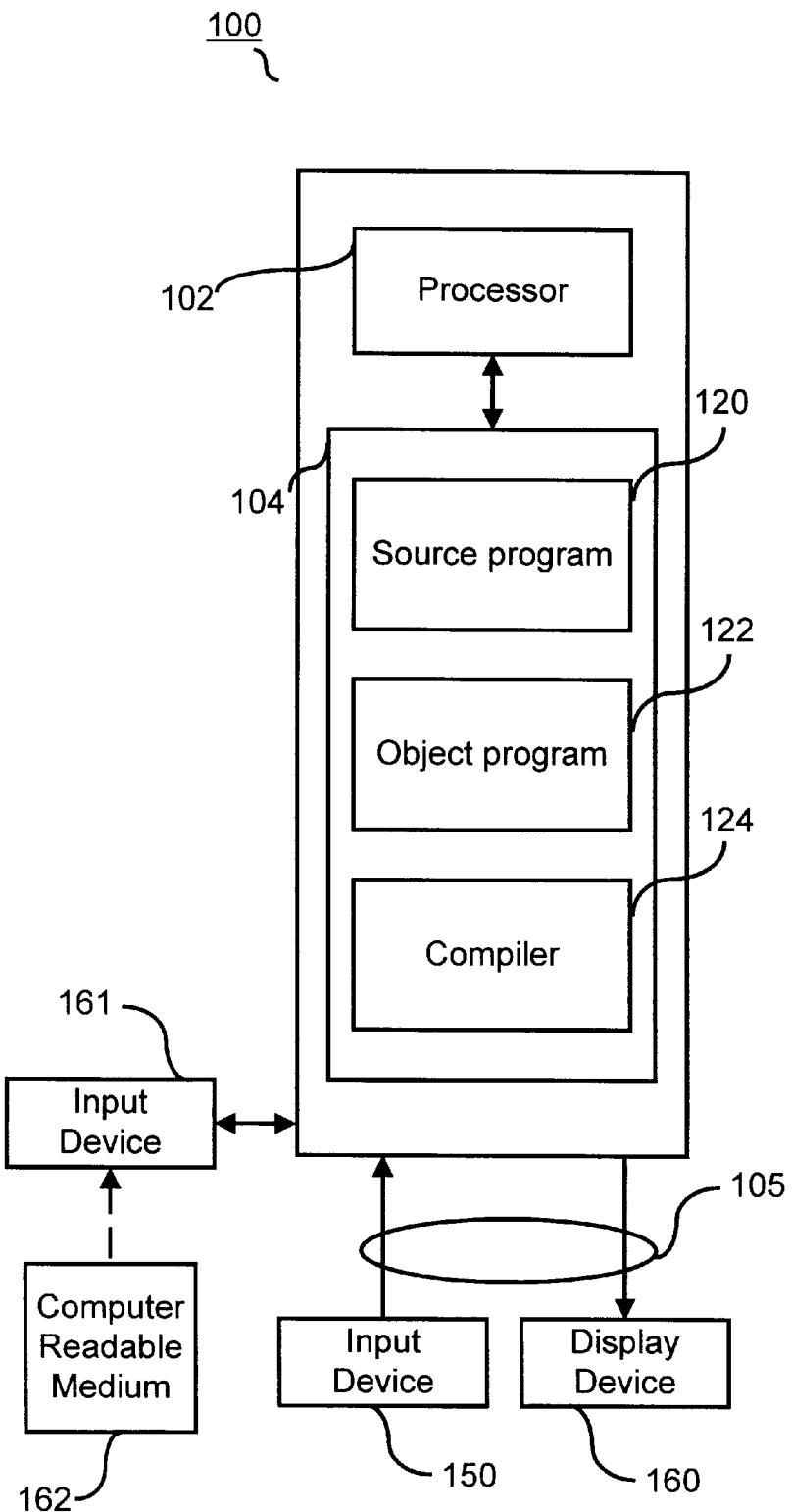
FIG. 1 is a block diagram of a data processing system used in accordance with a preferred embodiment of the present invention.

FIG. 1 is a block diagram of a data processing system used in accordance with a preferred embodiment of the present invention. In FIG. 1, computer system 100 includes a processor 102; a memory 104; input/output lines 105; an input device 150, such as a keyboard, a mouse, and a voice input device; and a display device 160, such as a display terminal. Computer 100 also includes an input device 161, such as a floppy disk drive, CD ROM reader, or DVD reader, that reads computer instructions stored on computer readable medium 162, such as a floppy disk, a CD ROM, or a DVD drive. These computer instructions are the instructions of e.g., compiler 124. Memory 104 also includes a source program, written in a high level language, such as, for example, the C programming language, or in assembly language.

A person of ordinary skill in the art will understand that memory 104 also contains additional information, such as application programs, operating systems, data, etc., which are not shown in the figure for the sake of clarity. It also will be understood that computer system 100 can also include numerous elements not shown, such as disk drives, keyboards, display devices, network connections, additional memory, additional CPUs, LANs, input/output lines, etc.

In the following discussion, it will be understood that the steps of methods and flow charts discussed preferably are performed by processor 102 (or similar processors) executing instructions stored in memory, such as instructions of compiler 124. It will also be understood that, the invention is not limited to any particular implementation or programming technique and that the invention may be implemented using any appropriate techniques for implementing the functionality described herein. The described embodiment is written in the C programming language, but the invention is not limited to any particular programming language or operating system.

Figure 2:
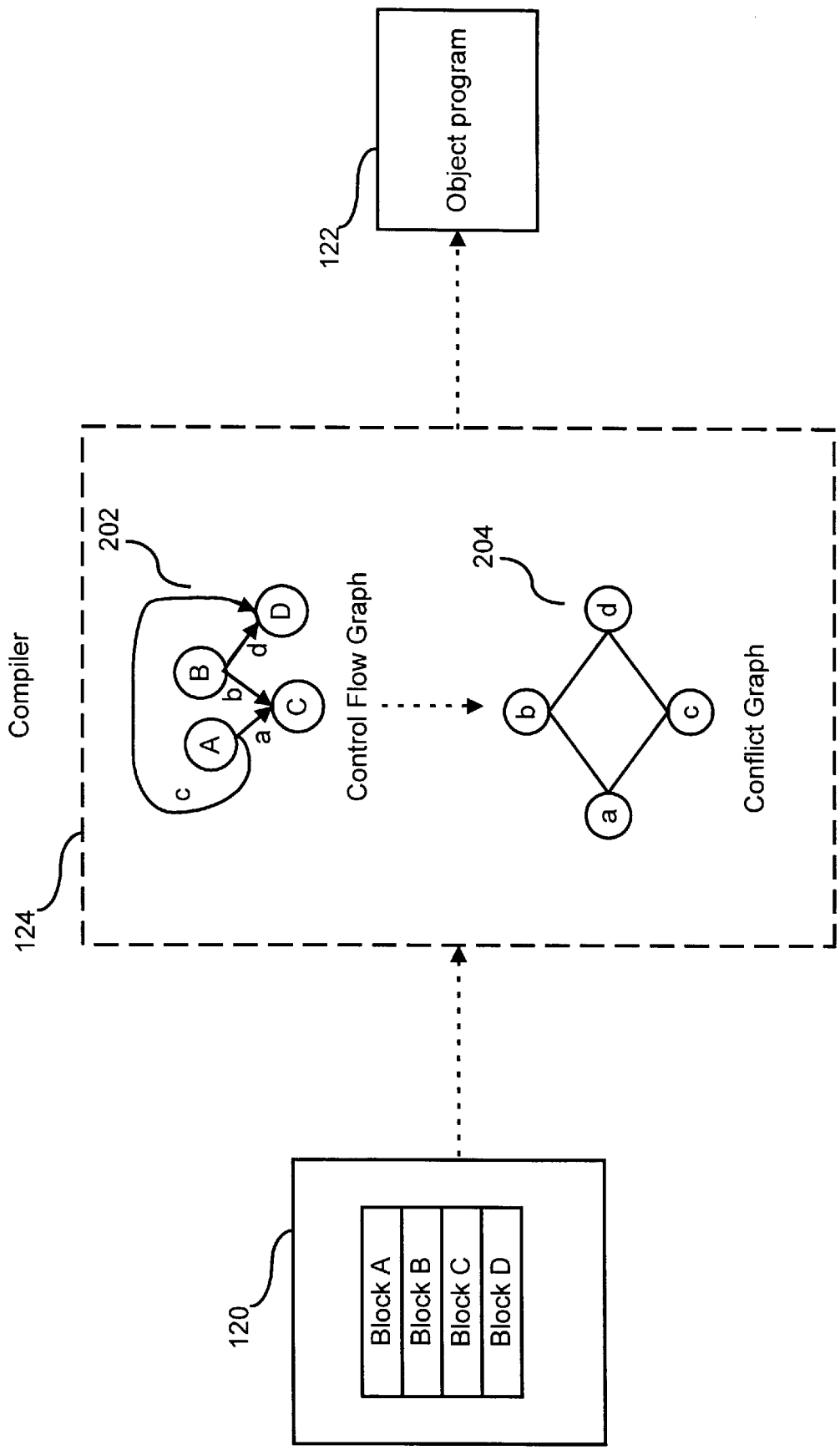
FIG. 2 is a block diagram showing a method of converting a source program to an object program in accordance with a preferred embodiment of the present invention.

FIG. 2 is a block diagram showing a process, performed by compiler 124, of converting a source program to an object program in accordance with a preferred embodiment of the present invention. Source program 120 can be thought of as containing a series of "blocks" (for example, blocks A, B, C, and D). Source program 120 is input to compiler 124. Internally, compiler 124 determines the locations of blocks in the source program, generates a control flow graph (CFG) 202 for the blocks, and generates a conflict graph 204 based on control flow graph 202. Compiler 124 then generates object program 126 in accordance with CFG 202 and conflict graph 204. Details of FIG. 2 are described below in connection with FIGS. 3–9.

Figure 3:
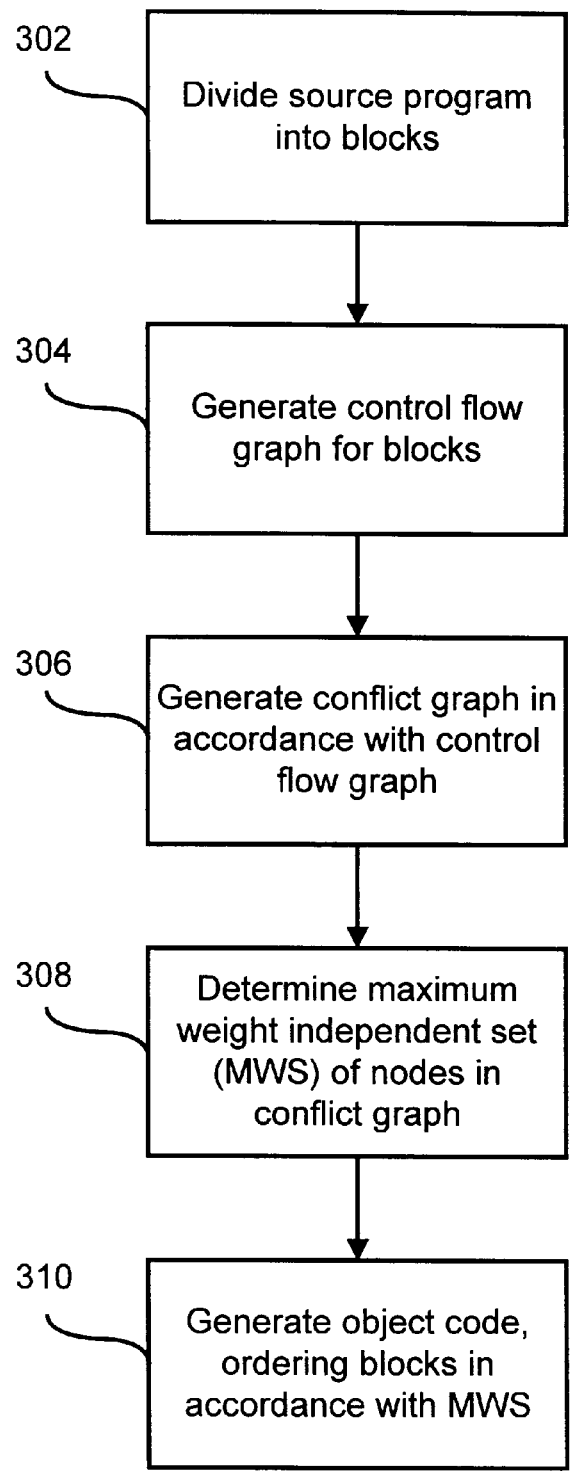
FIG. 3 is a flow chart showing steps of the of FIG. 2.

FIG. 3 is a flow chart showing steps of a method used by compiler 124 in a preferred embodiment of the present invention. In step 302, compiler 124 receives source program 120 and divides the source program into blocks.

FIG. 4 shows an example of a source program divided into blocks. The source program in the example is not intended to represent any particular programming language, but is intended to represent various constructs common to may programming languages, such as if-then-else statements (blocks B through E) and loops (blocks G through I). In FIG. 4, compiler 124 determines the location of blocks in source program 120 in accordance with conditional branches in the source program. The control flow at the end of a block may either proceed to the branch target or fall through to the following adjacent block. Thus, the "if-then" test is a block, the statement(s) under the "if-then" test are a block, the statement(s) under the "else" are a block, and the "endif" statement is a block. Similarly, the beginning, middle and end of the loop are designated as respective blocks. Methods of dividing a source program into blocks are well-known in the art and is described, for example, A. Aho, R. Sethi & J. Ullman, *Compilers, Principles, Techniques, and Tools*, published by Addison-Wesley, 1986, which is incorporated herein by reference. Any appropriate method of breaking a source program into blocks can be used.

In step 304 of FIG. 3, compiler 124 generates CFG 202 for the blocks of source program 120. A CFG represents the possible execution paths between the blocks. Each node in the CFG represents a block in source program 120. Each edge in the CFG represents a possible execution path between the blocks. Thus, compiler 124 generates CFG 202 accordance with the flow of control as shown in FIG. 2. For example, CFG 202 reflects the fact that block A can pass control to blocks C or D. Block B also can pass control to blocks C or D. Blocks C and D do not pass control to any other blocks. Methods of generating control graphs are described, for example in Aho et al., *Compilers, Principles, Techniques, and Tools*, cited above. Compiler 124 generates a CFG that accounts for the flow of control in all of source program 124.

Compiler 124 assigns node weights to edges of CFG 202 based on the profile frequency counts of the corresponding control flow edge. Thus, edges in the CFG corresponding to control flow paths that are statistically likely to be entered more often during execution are assigned a high frequency count. An example of assigning frequency counts is given in T. Ball & J. R. Larus, "Optimally profiling and tracing programs", Conference Record of the 19th ACM Symposium on Principles of Programming Languages, Albuquerque, NM, Jan. 1992, pp. 59–70, which is incorporated herein by reference.

Figure 5A:
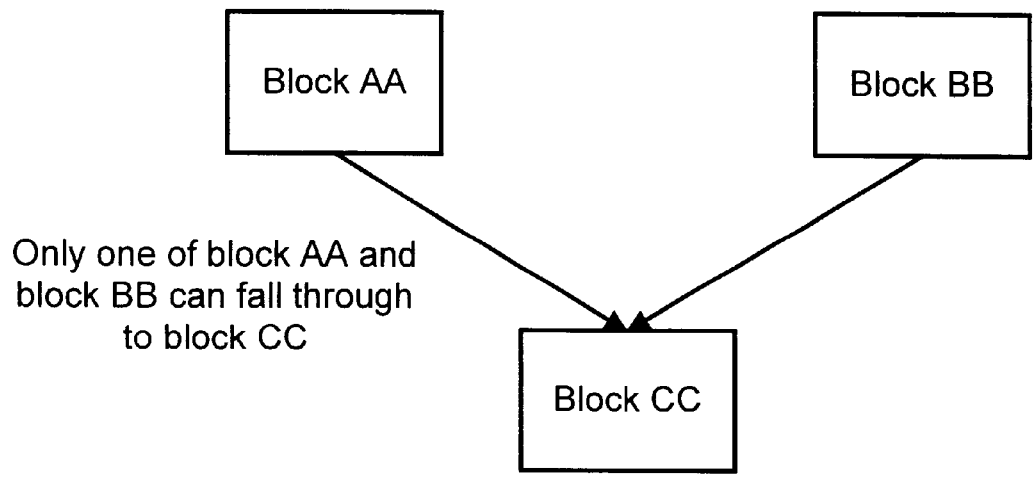
FIGS. 5(a) and 5(b) show examples of conflicting nodes in a control flow graph (CFG).
Figure 5B:
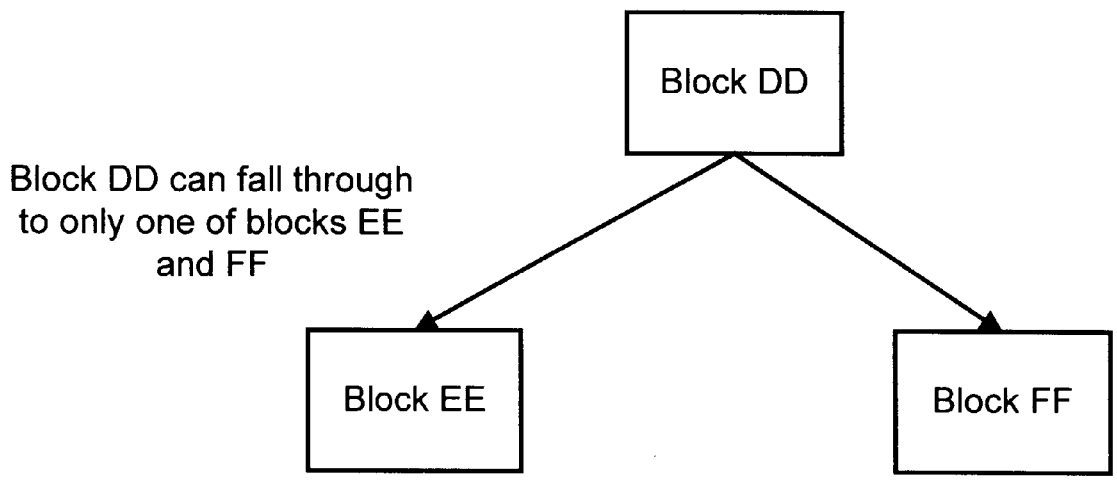

Next, in step 306, compiler 124 generates a conflict graph in accordance with CFG 202. In general, compiler 124 generates a node in the conflict graph for each edge (a, b, c, d) in the CFG. Two nodes in the conflict graph are connected if there is a "conflict" of flow between the edges in the CFG. Such edges are said to conflict. Edges in the CFG that conflict include: 1) edges that share a target block in the CFG and 2) edges that share a source block in the CFG. FIG. 5(a) shows an example of two edges that share a target block. In FIG. 5(a), only one of blocks AA and BB can fall through to block CC. FIG. 5(b) shows an example of two edges that share a source block. In FIG. 5(b), block DD can fall through to only one of blocks EE and FF.

Since, in FIG. 2, blocks A and B can both flow into block C, edges a and b in the CFG have a conflict and an edge is added in conflict graph 204 between nodes a and b. Similarly, since blocks A and B can both flow into block D, edges d and c in the CFG have a conflict and an edge is added to conflict graph 204 between nodes c and d.

Moreover, since block A can flow into both blocks C and D, edges a and c in the CFG have a conflict and an edge is added in conflict graph 204 between nodes a and c. Similarly, since block B can flow into both blocks C and D, edges b and d in the CFG have a conflict and an edge is added in conflict graph 204 between nodes b and d.

In FIG. 3, step 308 determines a maximum weight independent set (MWS) of nodes in conflict graph 204. An MWS is a set of nodes that do not share any edges and that have a maximum total node weight. In a conflict graph, where an edge between two nodes means that there is a conflict between the nodes, an MWS is a set of nodes having a maximum total node weight and where there are no conflicts between the nodes.

Figure 6:
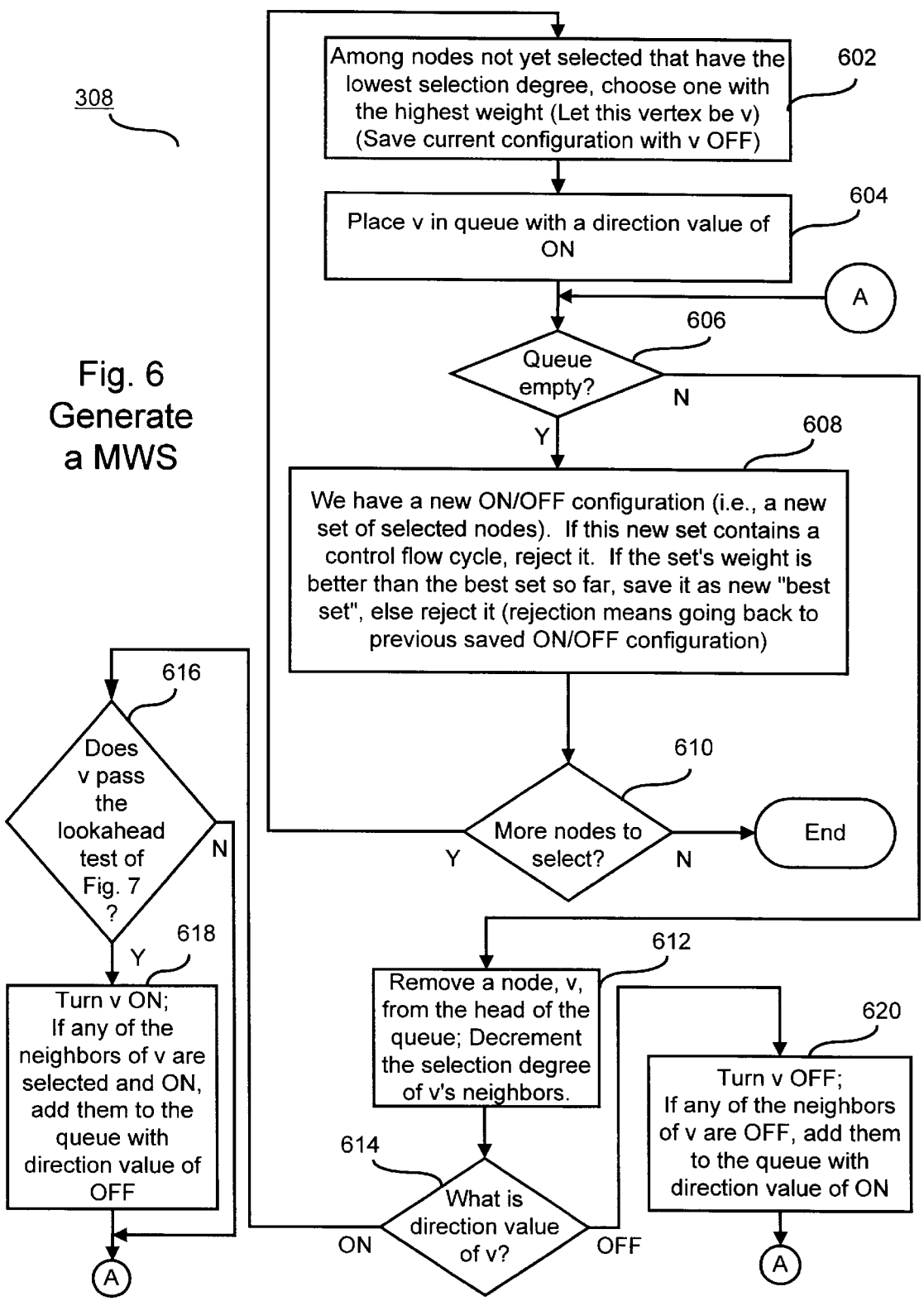
FIG. 6 is a flow chart showing a method of finding a maximum weight independent set (MWS).
Figure 7:
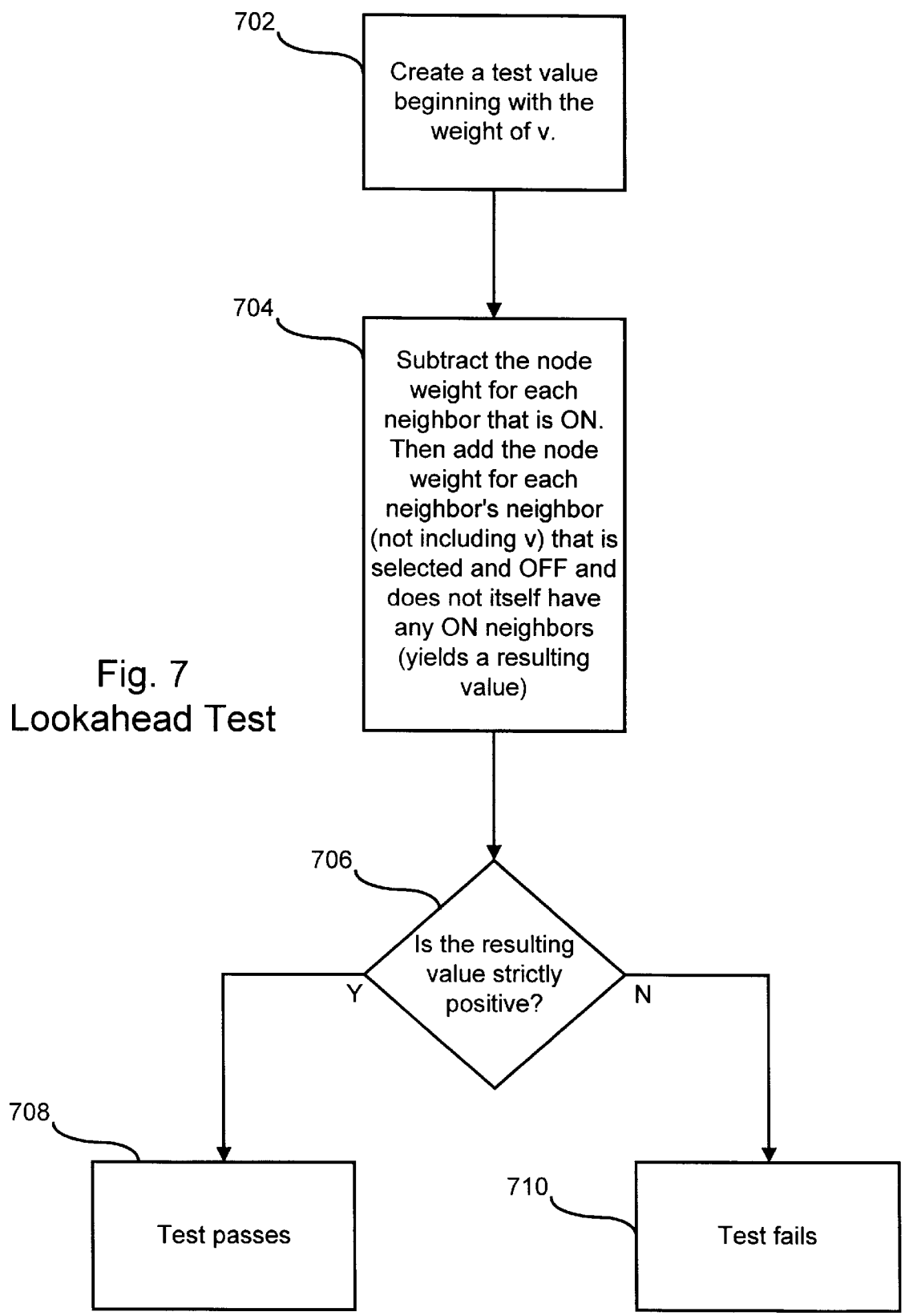
FIG. 7 is a flow chart showing details of the method of FIG. 6.

FIGS. 6 and 7 are flow charts showing a method of finding an MWS. FIGS. 8(a) through 8(f) show an example of generating an MWS for the example of FIG. 2.

In the method of FIG. 6, each node in conflict graph 204 can be turned ON or OFF (called a "direction value"). Each node can have a current direction value and a tentative direction value. The method processes nodes one at a time, generating a tentative direction value for each node by propagating ON and OFF node choices through the subgraph formed of already selected nodes. The value of a configuration is the sum of the weights of those nodes turned ON. The "best" and "previous" node configurations are saved at each step. If the new configuration is better than the best configuration so far, it is copied to the old "best" configuration (eliminating the previous best configuration). Propagation is performed using a FIFO node queue, where each queue entry includes a node and a direction value of ON or OFF.

Step 602 selects a node in conflict graph 204. The node is selected from among nodes in the conflict graph that are not yet selected and that have the lowest selection degree. (The method proceeds until (in step 610), all nodes have been selected as v.) Of these non-selected nodes having the lowest selection degree, the node with the highest weight is selected. The "selected graph" is the subgraph of the original conflict graph consisting of the selected nodes and any edge connecting two selected nodes. An edge in the selected graph is also called "selected." The "selection degree" of a node is the number of edges in the selected graph meeting it. For example, in FIG. 8(c), the selection degree of node c is "1." Although node c has two edges in the original graph, only one of them is in the selected graph. In FIG. 8(e), the selection degree of node c is "2" since it meets two selected edges. In the Figure, the weight of each node is represented next to each node (actually, the weight is stored within each node).

In FIGS. 8(a)–8(f), a selected node (see step 602) is indicated by a solid circle. In FIG. 8(a), the best weight so far starts at "0". Compiler 124 selects node a, which has been assigned a weight of 13 and which has an initial value of OFF. Compiler 124 puts node a on the queue with a direction of ON. Control then passes to step 612, where node a is removed from the queue and control passes to step 616. In this case, node a passes the lookahead test, since none of node a's neighbors are selected or ON. Thus, node a is turned ON in step 618 and control passes to step 606. Since the queue is empty, control passes to step 608.

In step 608, the new configuration (node a=ON) is adjudged to be the best so far and saved. Control passes to step 610, and then to step 602.

In FIG. 8(b) (see step 602), compiler 124 selects node c. Node c has been assigned a weight of 10 and has an initial value of OFF. Node c is put on the queue with a direction of ON. Control then passes to step 612, where node c is removed from the queue and control passes to step 616. In this case, node c does not pass the lookahead test (10−13=−3>0). Thus, node c remains OFF and node a remains ON. Control then passes to step 606. Since the queue is empty, control passes to step 608.

In step 608, the current configuration (node c=OFF, node a=ON) is compared to the best configuration so far and found not to be any better (the weight of the configuration of FIG. 8(b)=13 and the weight of the configuration of FIG. 8(a)=13). Thus, the new configuration of FIG. 8(b) is rejected. Node a reverts to ON and node c (which was previously not selected) reverts to OFF (see FIG. 8(c)). Control passes to step 610, and then to step 602.

In FIG. 8(d) (see step 602), compiler 124 selects node b, which has been assigned a weight of 8 and puts node b on the queue with a direction of ON. Node b is initially turned OFF. Control then passes to step 612, where node b is removed from the queue and control passes to step 616. In this case, node b passes the lookahead test (8−13+10=5). Thus, node b is turned ON in step 618, node a is added to the queue with a direction value of OFF, and control passes to step 606. Since the queue is not empty, control passes to step 612.

In step 612, node a is removed from the queue and control passes to step 620, where node a is turned OFF, node c is added to the queue with a direction value of ON, and control passes to step 606. Since the queue is not empty, control passes to step 612.

In step 612, node c is removed from the queue and control passes to step 616. Since node c passes the lookahead test, node c is turned ON and control passes to step 606. Since the queue is empty, control passes to step 608.

In step 608, the new configuration (node b=ON; a=OFF; c=ON) of FIG. 8(d) is adjudged to be the best so far and saved (18>13). Control passes to step 610, and then to step 602.

FIG. 8(e) shows the result of similar steps when node d, having a weight of 4, is selected in step 602. The resulting configuration is not the best so far (17<18), so the configuration reverts to the configuration of FIG. 8(d). Thus, the configuration of FIG. 8(d), where nodes b and c are ON and nodes a and d are OFF, forms the MWS.

FIG. 7 shows details of a lookahead test performed in step 616 of FIG. 6. In step 702, compiler 124 creates a test value, beginning with the weight of node v. In step 704, compiler 124 subtracts the node weight for each neighbor that is ON form the test value. Then, the node weight for each neighbor's neighbor (not including v) that is selected and OFF and that does not itself have any ON neighbors is added to the test value. If the resulting value is strictly positive (>0), the test passes. If not, the test fails.

Figure 9:
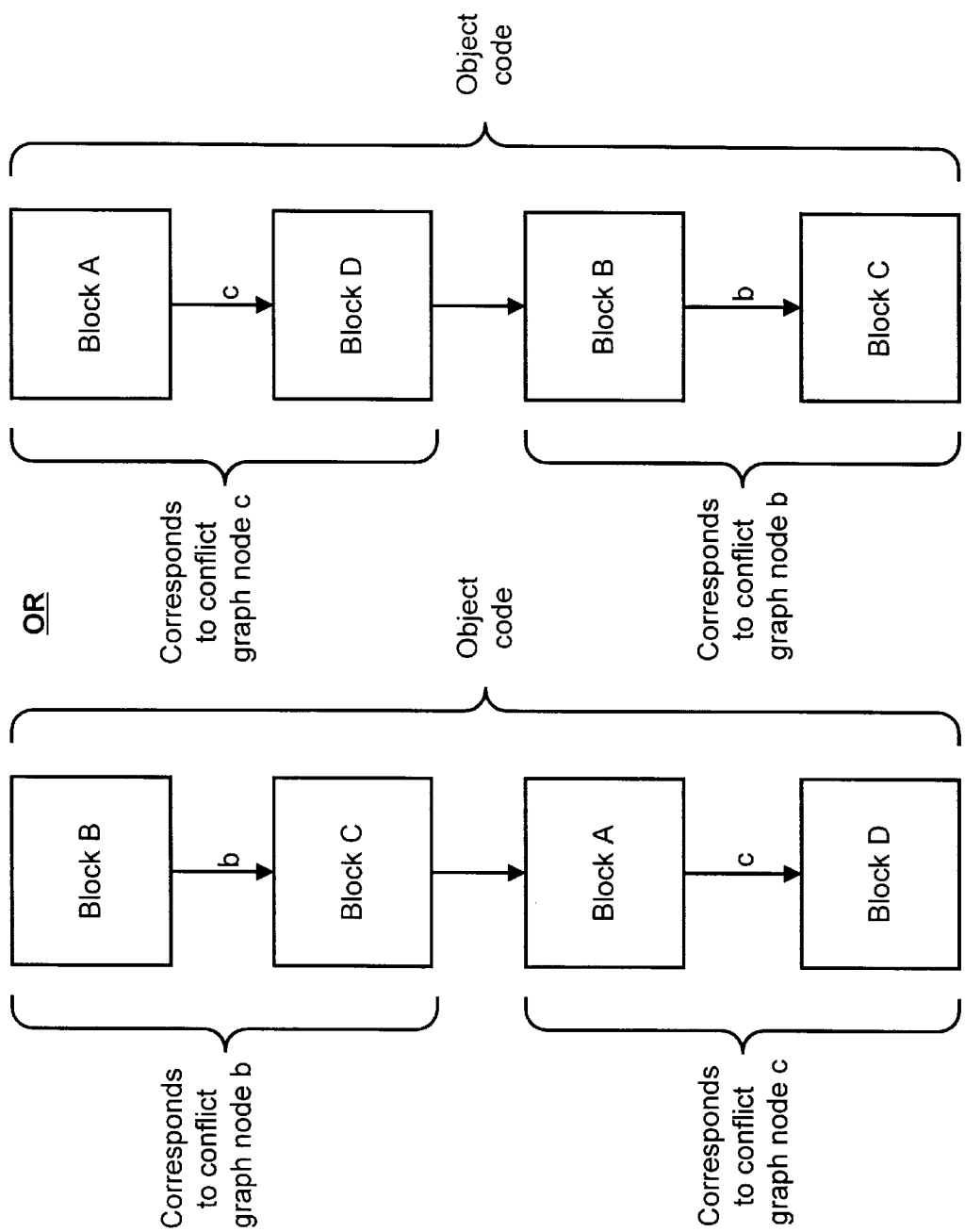
FIG. 9 shows an example of block ordering in an object program in the example of FIG. 8.

Returning to FIG. 3, compiler 124 generates object program 122, ordering blocks in accordance with the MWS found in step 308 (see FIG. 6). FIG. 9 shows two alternate ways that the blocks can be ordered in accordance with the MSW and the CFG. In the first alternative, blocks B and C precede blocks A and D. In the second alternative, blocks A and D precede blocks B and C. Either alternative is acceptable, since CFG 202 does not specify whether block B should precede block A or vice versa. If CFG 202 indicated a preferred order, then the blocks would be ordered in accordance with the order indicated by the CFG.

The following paragraphs contain a theoretical discussion of the described embodiment of the present invention. The discussion addresses the fact that the MWS problem is NP-complete.

We call a sequence of non-repeating vertices $(v_1, \ldots, v_n)$ a "string." We say the string starts at $v_1$ and ends at $v_n$. We determine the weight of a string by the contributions from adjacent pairs of vertices, where if $(v_i, v_{i+1})$ is not an edge, its weight is zero and if $(V_i, V_{i+1})$ is an edge, its weight is that of the edge. An optimal solution then corresponds to a maximum-weight string where the edge weights are the execution frequency. We call this the maximum weight string problem.

A "circuit" is a sequence of vertices $(v_1, \ldots v_n)$, with $v_1 = v_n$ and $\{v_1, \ldots, v_{n-1}\}$ all distinct with each $(v_i, v_{i+1})$ being an edge in the graph. A "partial circuit" is one where we drop the requirement that $(v_i, v_{i+1})$ is an edge. The weight of a partial circuit is determined analogously to that of a string.

We claim that the maximum-cost string problem is NP-complete. First, it is clear that the problem is NP, since it is certainly polynomial to determine the weight of a string. Hamiltonian Circuit problems are usually posed in terms of undirected graphs. An undirected graph has an equivalent directed graph formed by turning each undirected edge into two directed edges, between the same two vertices, each edge going the opposite direction with the same weight as the original undirected edge. See, C. Papadimitriou & K. Steiglitz, *Combinatorial Optimization,* Prentice Hall, 1982, which is incorporated herein by reference. We shall consider Hamilton Circuits in directed graphs.

Let G be an instance of the Hamilton Circuit problem for directed graphs. To show the NP-completeness of the maximum-cost string problem, we construct G' an instance of that problem and show the equivalence of the two problems. We pose the problem in G' as finding a string with weight greater than or equal to a certain fixed value, rather than the maximum weight string, since this is polynomially equivalent.

We construct G' from G as follows. Split each vertex, v, of G into two, v' and v" with an edge of weight of 1 from v' to v". We connect all the in edges of v to go into v' and all the out edges of v to now go out of v". We set the weight of all the original edges in G to zero. Let N be the number of vertices in G. Pick one of the new edges just added (v',v") and delete it, adding two new vertices, u and w, along with edges (v', u) and (w, v") both with weight N+1. Call this new modified graph G'. Each new edge of G' corresponds to a vertex in G, except for (v',u) and (w,v") which correspond to the same edge.

A Hamiltonian circuit in G meets each vertex precisely once. Take the edges in this circuit and add in the new edges of G'. Since the edges (v',u) and (w,v") do not connect, we have a string and it has a maximum weight in G'. The weight is N−1+2(N+1).

Say S is a string in G' with weight N−1+2(N+1). Then every new edge must be included in S. Let C be the set of edges resulting from deleting the new edges of G' from S.

Then, because of the correspondence of new edges in G' with vertices in G, C is a circuit that includes each vertex of G precisely once. Thus the maximum-cost sting problem is NP-complete.

In summary, the described embodiment of the present invention provides a method and apparatus for reordering the blocks of a computer program for efficient execution.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of ordering the blocks of a computer program for efficient execution, the method comprising the steps, performed by a data processing system, of:

dividing the computer program into a plurality of blocks;

generating a control flow graph representing a flow of control between the plurality of blocks;

generating a conflict graph in accordance with the control flow graph, where the edges of the conflict graph indicate which paths in the flow of control have conflicts;

determining a maximum weight independent set of the conflict graph; and ordering the blocks of the computer program in accordance with the determined maximum weight independent set.

2. The method of claim 1, wherein the step of generating the control flow graph includes the step of generating a weight for each edge of the control flow graph, representing a frequency with which the path corresponding to the edge is entered in the control flow.

3. The method of claim 1, wherein the step of generating the conflict graph includes the step of generating a conflict graph where each node in the conflict graph corresponds to an edge in the control flow graph.

4. The method of claim 1, wherein the step of ordering the blocks is performed in accordance with the maximum weight independent set and the control flow graph.

5. The method of claim 1, wherein the step of determining the maximum weight independent set of the conflict graph includes the step of generating a configuration subgraph for each node in the conflict graph.

6. The method of claim 5, wherein the step of determining the maximum weight independent set of the conflict graph further includes the step of determining a best weight so far for the subgraphs.

7. A method of ordering the blocks of a computer program for efficient execution, the method comprising the steps, performed by a data processing system, of:

dividing the computer program into a plurality of blocks;

generating a control flow graph representing a flow of control between the plurality of blocks;

generating a conflict graph in accordance with the control flow graph, where the edges of the conflict graph indicate which paths in the flow of control have conflicts;

determining a maximum weight independent set of the conflict graph, the determining step including the steps of:

turning an initial node in the conflict graph ON and placing it on a queue in a memory, removing a next node, v, from the queue, when the direction of a next node on the queue is ON, and when any neighbor nodes of v are selected and ON, turning the neighbor nodes OFF and placing the neighbor nodes on the queue, when the direction of a next node on the queue is OFF, and when any neighbor nodes of v are OFF, turning the neighbor nodes ON and placing the neighbor nodes on the queue, and keeping the highest weight set thus far as the new maximum weight independent set; and ordering the blocks of the computer program in accordance with the determined maximum weight independent set.

8. The method of claim 7, wherein the step performed when the direction of the next node on the queue is ON, further includes a lookahead test, so that the neighbor nodes are only placed on the queue if they pass the lookahead test.

9. An apparatus that orders the blocks of a computer program for efficient execution, the apparatus comprising:

a portion configured to divide the computer program into a plurality of blocks;

a portion configured to generate a control flow graph representing a flow of control between the plurality of blocks;

a portion configured to generate a conflict graph in accordance with the control flow graph, where the edges of the conflict graph indicate which paths in the flow of control have conflicts;

a portion configured to determine a maximum weight independent set of the conflict graph; and a portion configured to order the blocks of the computer program in accordance with the determined maximum weight independent set.

10. The apparatus of claim 9, wherein the portion configured to generate the control flow graph includes a portion configured to generate a weight for each edge of the control flow graph, representing a frequency that the path corresponding to the edge is entered in the control flow.

11. The apparatus of claim 9, wherein the portion configured to generate the conflict graph includes a portion configured to generate a conflict graph where each node in the conflict graph corresponds to an edge in the control flow graph.

12. The apparatus of claim 9 wherein the portion configured to order the blocks is coupled to the portion configured to generate a conflict graph and the portion configured to determine a maximum weight independent set, and operates in accordance with the maximum weight independent set and the control flow graph.

13. The apparatus of claim 9, wherein the portion configured to determine the maximum weight independent set of the conflict graph includes a portion configured to generate a configuration subgraph for each node in the conflict graph.

14. The apparatus of claim 13, wherein the portion configured to determine the maximum weight independent set of the conflict graph further includes a portion configured to determine a best weight so far for the subgraphs.

15. A computer program product, including:

a computer usable medium having computer readable code embodied therein for causing ordering of the blocks of a computer program for efficient execution, the computer program product comprising:

computer readable program code devices configured to cause a computer to effect dividing the computer program into a plurality of blocks;

computer readable program code devices configured to cause a computer to effect generating a control flow graph representing the flow of control between the plurality of blocks;

computer readable program code devices configured to cause a computer to effect generating a conflict graph in accordance with the control flow graph, where the edges of the conflict graph indicate which paths in the flow of control have conflicts;

computer readable program code devices configured to cause a computer to effect determining a maximum weight independent set of the conflict graph; and computer readable program code devices configured to cause a computer to effect ordering the blocks of the computer program in accordance with the determined maximum weight independent set.

* * * * *